United States Patent [19] [11] 4,025,448
Sudol [45] May 24, 1977

[54] SUPERPARAMAGNETIC WAX COMPOSITIONS USEFUL IN MAGNETIC LEVITATION SEPARATIONS

[75] Inventor: Jean Josephine Sudol, New York, N.Y.

[73] Assignee: Union Carbide Corporation, New York, N.Y.

[22] Filed: Dec. 29, 1975

[21] Appl. No.: 645,039

[52] U.S. Cl. .............................. 252/60; 252/62.51; 252/62.52; 252/62.53; 209/1; 106/272; 106/31

[51] Int. Cl.² ....................... H01F 1/00; H01F 1/28

[58] Field of Search ................ 209/1; 106/272, 31; 252/60, 62.52, 62.53, 62.51

[56] References Cited

UNITED STATES PATENTS

| 3,284,360 | 11/1966 | Peshin | 252/62.53 |
|---|---|---|---|
| 3,483,968 | 12/1969 | Kaiser | 209/1 |
| 3,483,969 | 12/1969 | Rosensweig | 209/1 |
| 3,488,531 | 1/1970 | Rosensweig | 310/46 |
| 3,531,413 | 9/1970 | Rosensweig | 252/62.51 |
| 3,635,819 | 1/1972 | Kaiser | 252/62.51 |
| 3,700,595 | 10/1972 | Kaiser | 252/62.51 |
| 3,764,540 | 10/1973 | Khalafalla et al. | 252/62.52 |
| 3,788,465 | 1/1974 | Reimers et al. | 209/1 |
| 3,843,540 | 10/1974 | Reimers et al. | 252/62.52 |
| 3,917,538 | 11/1975 | Rosensweig | 252/62.52 |

OTHER PUBLICATIONS

Kaiser, R. and Miskolczy, J. Applied Physics, 41, No. 3, 1064, (1970).

*Primary Examiner*—Mayer Weinblatt
*Assistant Examiner*—John D. Smith
*Attorney, Agent, or Firm*—Richard G. Miller

[57] ABSTRACT

Superparamagnetic wax compositions useful in magnetic levitation separations of particle mixture based on density differences are provided which have the ability to withstand without phase separation repeated melt-freeze cycling. The stability is obtained by using a mixture of hydrocarbon and oxygenated waxes.

9 Claims, No Drawings

SUPERPARAMAGNETIC WAX COMPOSITIONS USEFUL IN MAGNETIC LEVITATION SEPARATIONS

The present invention relates in general to compositions useful as media for the separation of particles of different densities. More particularly, the invention relates to novel compositions comprising stable colloidal suspensions of superparamagnetic particles in wax mixtures suitable for use in magnetic separation processes.

The principles that only recently have been utilized in density separation processes using superparamagnetic fluids were elucidated many years ago. In general terms the processes involve introducing a mixture of solid particles of at least two substances having different densities into a fluid medium having superparamagnetic properties and imposing an inhomogeneous magnetic field on the system. Although under the influence of the magnetic field, the magnetic fluid exhibits a number of behavioral aspects not characteristic of normal fluids, the significant effect, insofar as the density separation process is concerned, is an additional non-uniform pressure, equivalent to the magnetic energy density, that is created in the fluid. This pressure exerts on the particles introduced a net force, independent of the density of the particles, having the same direction as the gradient of the magnitude of the imposed magnetic field. By applying the magnetic field in such a manner that the force on the particles is opposed to the force of gravity thereon, a buoyancy can be created for dense particles which is directly related to their density. Thus, of the particles placed in the magnetic fluid, those of the higher density can be made to "sink" and those of lesser density can be made to "float.". Once the particles are segregated in the fluid by virtue of their density valves, a variety of mechanical means can be used to isolate the various segregated portions of particles from the system.

The separation of mixed particles on the basis of their respective densities by magnetic levitation has more recently been proposed using as the magnetic fluid a stable colloidal suspension of superparamagnetic particles in such liquid media as kerosene, xylene, silicone oil, fluorocarbons, organic esters and water. A procedure of this type is disclosed in U.S. Pat. No. 3,488,531, issued Jan. 6, 1970 to R. E. Rosensweig. Superparamagnetic materials are those which are highly magnetizable in a magnetic field, but do not retain their magnetism when the field is removed. There is accordingly no hysteresis loop in their magnetization curves. The most common superparamagnetic substances are iron, the iron oxide $Fe_3O_4$ (megnetite), cobalt and nickel. Additionally, some rare earth compounds, certain alloys of platinum and rhenium as well as aqueous solutions of manganese salts can be classified as superparamagnetic materials. Of the known members of this class, iron has by far the highest magnetic susceptibility.

In copending application Ser. No. 644,806 filed Dec. 29, 1975 and entitled "Apparatus and Process for the Separation of Particles of Different Density with Ferromagnetic Media," there are disclosed particle separation processes which utilize ferromagnetic media which are readily transformed from the liquid to the "solid" state. When the ferromagnetic medium is in the liquid phase, non-colloidal particles introduced thereinto can be separated by magnetic levitation into separate zones of the medium on the basis of their respective densities. Upon solidification of the medium, the separated particles are maintained in their respective zones since the particles cannot rediffuse in the solid system. The solid medium can then be divided by a variety of mechanical means into portions which contain a desired fraction of the separated particles and the particles isolated therefrom after converting the medium to the liquid phase again.

In the aforesaid processes it has been found, however, that conventional wax compositions such as paraffin waxes tend to undergo phase separation of the original colloidal suspension of ferromagnetic particles after a number of freeze-melt cycles. It is therefore advantageous to use in the process a magnetic wax composition which is highly stable toward such phase separation and thus avoids the expenses involved in preparing fresh media and/or revitalizing the partially depleted media.

It is accordingly the general object of the present invention to provide stable superparamagnetic wax compositions suitable for use in magnetic levitation particle separation processes in which the wax composition serves as the magnetic fluid and undergoes cyclic phase changes from solid to liquid.

The foregoing object and other more particular objects which will be apparent from the specification are accomplished by a composition of the present invention which comprises a mixture of from 10 to 90 weight percent of an aliphatic hydrocarbon wax and complimentarily from 90 to 10 weight percent of an oxygenated wax based on the total wax content of the overall composition, said total wax constituting at least 10 percent of the overall composition, said wax mixture containing as a colloidal dispersion therein from 1 to 70 weight percent based on the overall composition of a superparamagnetic substance, and from 1 to 20 weight percent based on the overall composition of at least one surface active agent selected from the group consisting of anionic, cationic and non-ionic dispersants, at least a portion of which is solvatable in the said wax mixture.

As used herein and in the claims, the term aliphatichydrocarbon wax is intended to denote those waxes of petroleum, mineral or synthetic origin, which waxes are characterized by their predominate content of paraffinic hydrocarbons having molecular weights of greater than ~ 190. The most common and readily available of these waxes are the conventional paraffin waxes derived from petroleum refining, but ceresin, and ozocerite waxes derived from mineral sources are also readily available and are suitable for use in the present compositions. Also suitable are the synthetic polyethylene waxes.

The oxygenated waxes, as the term is used herein, are principally those of animal, insect or vegetable origin and are characterized by a predominate content of high molecular weight acids, alcohols and non-glyceral esters of long chain organic acids. Common wax acids include cerotic, lauric, myristic, palmitic, polymetic and melissic. Common alcohols which can be present as free alcohols or as esters of the aforesaid acids in oxygenated waxes are cetyl, ceryl, stearyl and myricyl. Important oxygenated waxes include beeswax carnauba, ouricury, palm, raffia, Japan, esparto, spermaceti and bayberry. Synthic oxygenated waxes which exhibit many of the properties of their naturally occurring counterparts include the esterification products of polyethylene glycol or sorbitol with stearic acid, and the reaction product of maleic anhydride and polyethylene.

The particular superparamagnetic material colloidally dispersed in the wax medium is not a critical factor. Preferably, materials having the highest magnetic susceptibility such as iron, magnetite, cobalt or nickel are used so that the saturation magnetization of the final composition will be at least 10 gauss when the superparamagnetic material constitutes 70 weight percent. When iron or magnetite is used as the superparamagnetic colloid material in amounts of from 1 to 70 weight percent the saturation magnetization of the ferromagnetic wax composition ranges from 10 gauss to 700 gauss. It is preferred that this property ranges from 50 to 400 gauss.

The size of the colloidal particle can vary between 30 A and 3 micrometers. In any real preparation there will be a distribution of particle size. The most favorable range will average between 50 and 150A in size, the most preferred size averaging 100A.

Since the superparamagnetic materials are inorganic in nature, they are much more polar than either the hydrocarbon waxes or the oxygenated waxes. Perhaps more importantly when in colloidal form the superparamagnetic materials have high surface areas and secondary bonding forces which would lead to agglomeration of the colloid except for the presence of the stabilizing or dispersing agent adsorbed on the surface of the colloidal iron, magnetite, cobalt, nickel, or other superparamagnetic material. Characteristically the surface-active agent adsorbed on the colloid has a polar portion in direct contact with the polar surface and a non-polar portion available for solvation by the continuous organic phase. The stabilizing agent or dispersant thus helps prevent agglomeration of the colloidal particles via their intrinsic self-attraction as well as providing solvation sites.

The particular surface active agent or dispersing aid which is employed is not a critical factor. To fulfill their function of forming monolayers or thin layers at the interface of phases of differing polarity, these compounds have polar, hydrophilic, and nonpolar, oleophilic, moieties in the molecule. Surface-active agents can be divided into three classes depending on whether the polar group is positively charged, negative charged, or uncharged. Those agents which are positively charged are called cationic and this class can be illustrated by the organically substituted ammonium salts such as benzyltrimethylammonium chloride. Those agents which are negatively charged are termed anionic and this class can be illustrated by salts of organic fatty acids (soaps), organosulfosuccinates, sulfonated alkylaryl compounds (detergents), alkylated phenols, fatty acids themselves, sulfate salts, and phosphate salts. The uncharged class are termed nonionic and this class generally is made up of reaction products of ethylene oxide such as alkylated ethoxylated phenols, ethoxylated mercaptans, ethoxylated sugars, and ethoxylated ethers. Any of these types of compounds which are at least partially solvatable in the wax mixture can be used as dispersants in the formulation of the superparamagnetic wax compositions of the present invention.

Particularly preferred, generally in the magnetic fluid art and also in the present compositions, is oleic acid. Ethoxylated alkyl penol is also an especially good dispersant. The optimum amount of surface active agent employed is dependent in part upon the average particle size of the colloidal particles suspended in the wax medium since, in general, more dispersant is necessary for high surface-area colloids than for low surface-area colloids. Generally, from 1 to 20 weight percent of the surface active agent can be employed based on the overall composition weight, with from 2 to 15 weight-% being preferred. It is particularly preferred to use from about 1/5 to ⅛ the amount of surface active agent as the weight of colloid superparamagnetic material present, up to a maximum of 20 weight-% as hereinbefore indicated.

If desired, the magnetic fluids of this invention can also contain additives such as antioxidants which tend to stabilize the other ingredients from oxidative degradation at elevated temperatures. For this purpose from 0.05 to 0.2 weight percent conventional antioxidants such as are found among metal drying salts, sulfur containing compounds, amino compounds, hydroethers, phenol, benzoin and citric acid. Silica gel is also effective in this regard. Other additives can include colorants, plasticizers and the like.

By the appropriate selection of the oxygenated wax and the hydrocarbon wax, a composition having a relatively sharp melting point or range can be attained, the melting point being above 40° C. and below 150° C., preferably 50 to 65° C. It is preferred that the melting range, i.e. the temperature range over which the transition from solid to liquid is complete, be from about 3 to about 10° C.

Several general routes are available for preparing the novel ferromagnetic compositions of this invention. One can synthesize colloidal magnetite in an aqueous medium by peptization from soluble iron salts, in the presence of a dispersant, wash out the water-soluble impurities, and then add the colloid directly to molten wax. Alternatively one can use this peptization method to prepare an ordinary magnetic liquid by adding an organic liquid such as kerosene, xylene, or toluene to the peptizing reaction. The low viscosity of the organic liquid makes for a cleaner separation between the aqueous layer and the organic layer. Then upon coagulating the colloidal magnetic gum by means of a miscible polar liquid such as acetone, after washing with additional acetone and drying, one has a more pure magnetic colloid for adding to molten wax. Another general route is to prepare a magnetic liquid based on a comparatively low boiling organic liquid such as toluene or xylene, add molten wax to the ferromagnetic liquid, and then boil off the organic liquid. Also one can prepare a magnetic fluid based on a high-boiling compatible liquid such as kerosene, add molten wax, and use the composition through its freeze/melt cycles with residual kerosene left in the composition as a plasticizer. It should be emphasized that preparing a ferromagnetic wax composition from a ferromagnetic liquid containing a high-boiling solvent such as kereosene by addition of molten wax or wax mixture results in a permanently plasticized was from which the high-boiling solvent is not removed either in the preparation or the use. No effect of consequence results from the fact that ferromagnetic solid/liquid compositions are thus plasticized. Finally, one may grind magnetite over several days or weeks in the presence of a dispersant and then mix the colloid with wax.

The novel compositions of this invention and the method for their preparation are illustrated by the following examples:

EXAMPLE 1(a)

Preparation of Ferromagnetic Fluid by Peptization

Into 1 liter of water 258 g. of ferric chloride hexahydrate and 108.5 g. of ferrous chloride tetrahydrate were dissolved with stirring by a glass rod (nonmagnetic). Separately 350 milliliters of ammonia was diluted into 350 ml. of water, and then over a span of 75 seconds added to the iron salt solution. With continued stirring and heating the colloidal magnetite was brought to 90° C. Separately 40 ml of oleic acid was added to 460 ml kerosene and also heated to 90° C. When both the ammoniacal magnetite and organic solution are above 90° C. they are mixed and stirred for 15 minutes. The upper organic layer was drawn off. A stable ferromagnetic liquid results with a saturation magnetization of 252 gauss, a density of 1.038 g/ml, a viscosity of 4.3 cps, and in a laboratory electromagnet of 165 oe/cm magnetic gradient had an apparent levitating density of 4.38 g/ml.

b. Preparation of a Stable Ferromagnetic Wax by Solvent Technique

Using the peptization technique of part (a), a magnetic fluid of 250 gauss saturation magnetization comprising 67 weight percent kerosene, 25 weight percent magnetite, and 8 weight percent oleic acid was made. To a 225 g. sample of this product, 150 ml. of acetone was added with stirring, causing agglomeration of the colloidal magnetite. The agglomerated mass of precipitate was held in place at the bottom of the beaker with a laboratory magnet while the kerosene and acetone were poured off. The precipitate was washed with two 50-ml. portions of acetone, which were poured off in the same manner while the sludge was held, and the sludge was then centrifuged at 1100 rpm for 10 minutes to dry it. Then a premelted mixture of 360 g. of paraffin wax and 90 g. of white beeswax U.S.P. was added and warmed to about 65° C to remove any residual acetone. This ferromagnetic solid had a melting range of 50–60° C and a saturation magnetization of 80 gauss.

c. In the same manner as part (a), 516 g. ferric chloride hexahydrate and 217 g. of ferrous chloride tetrahydrate were dissolved in 1.5 liter of water and filtered. Then 600 ml of ammonia was added with stirring. While the solution was heating, 440 ml of melted paraffin wax and 60 ml of oleic acid were separately heated. When both solutions had reached 90° C, they were mixed and kept at 90° C for 30 minutes. The organic layer is an unstable ferromagnetic coagulum.

EXAMPLE 2

Preparation and Testing for Stability of Ferromagnetic Wax Compositions.

A variety of different waxes and wax mixtures were used to prepare ferrowax compositions by the peptization technique. The twelve wax mixtures of Table I were prepared by simple melting of the two waxes in a beaker, cooling in a Pyrex pan, and later remelting in the presence of colloidal magnetite. The latter was obtained by the method of part (A) of Example 2. The colloidal magnetite was precipitated by adding 750 ml of acetone to 250 ml of ferromagnetic liquid prepared by the method of Example 1, which had a saturation magnetization of 340 gauss. After precipitation with acetone, the agglomerated solid mass was washed with 200 ml acetone and then centrifuged at 1100 rpm for ten minutes to dry it. The wax mixture and magnetite were combined in a glass beaker on a hot plate and vigorously stirred at about 80° C. The stability of each ferromagnetic wax labeled "stable" was measured by at least 15 liquid/solid cycles in a magnetic field provided by an Alnico permanent magnet without phase separation or deterioration of any type. Those compositions labled "unstable" evidenced phase separation on the first or second liquid/solid cycle. At the conclusion of these 12 tests, a portion of each ferromagnetic composition was diluted with an equal amount of its own wax mixture, thus reducing the percentage of magnetite and its saturation magnetization in half (from about 200 to about 100 gauss). Then the stability test was repeated with exactly the same results: the wax mixtures labeled "stable" again withstood 15 additional melt/cool cycles without separation, while those labeled "unstable" again separated on mixing or within one or two liquid/solid cycles.

TABLE I

| Mixture No. | Wax Components and Weight Ratio | | Mixture Wax(g) | Colloidal Magnetite(g) | Result |
| --- | --- | --- | --- | --- | --- |
| a | Carnauba No. 1 yellow | 1 | 22.5 | 30 | stable |
|   | medium-grade paraffin | 1 | | | |
| b | Carnauba No. 1 yellow | 1 | 22.8 | 30 | stable |
|   | paraffin | 3 | | | |
| c | Carnauba No. 3 north country | 1 | 22.8 | 30 | stable |
|   | paraffin | 1 | | | |
| d | Carnauba No. 3 north country | 1 | 23 | 30 | stable |
|   | paraffin | 3 | | | |
| e | Cardis No. 319 ester sap. no. 65-70 | 1 | 22.5 | 21 | stable |
|   | paraffin | 1 | | | |
| f | Cardis No. 319 ester modified petroleum | 1 | 22.5 | 21 | stable |
|   | paraffin | 3 | | | |
| g | Zeco 63-316 microcrystalline hydrocarbon, ceresin | 1 | 22.5 | 21 | unstable |
|   | paraffin | 3 | | | |
| h | Zeco 63-316 microcrystalline ceresin | 1 | 22.5 | 21 | unstable |
|   | paraffin | 1 | | | |
| i | Hoechst OP-27 partially saponified ester | 1 | 21.2 | 20.7 | stable |
|   | paraffin | 1 | | | |
| j | Hoechst OP-27 partially saponified ester | 1 | 22.5 | 21 | stable |
|   | paraffin | 3 | | | |
| k | Petrolite P-25 branched microcyrstalline high mol. weight hydrocarbon | 1 | 22.5 | 20.8 | unstable |

TABLE I-continued

| Mixture No. | Wax Components and Weight Ratio | | Mixture Wax(g) | Colloidal Magnetite(g) | Result |
|---|---|---|---|---|---|
| 1 | paraffin | 3 | 12.9 | 12 | unstable |
| | Petrolite P-25 hydrocarbon | 1 | | | |
| | paraffin | 1 | | | |

EXAMPLE 3

A number of stable ferrowax compositions were prepared to demonstrate the wide variability in the proportions of hydrocarbon wax and oxygenated wax that are suitably employed in the preparation of the present magnetic fluids. First a ferromagnetic liquid of saturation magnitization equal to 200 gauss was prepared from iron carbonyl. Into 150 ml of kerosene of added 37 ml of Teritol NP 14, a dispersant manufactured by Union Carbide Corporation of New York, N.Y. with a chemical formula of tetraoxylated nonyl/phenol and 100 ml of iron pentacarbonyl. The mixture is heated to 190° C while 3 percent oxygen in nitrogen is bubbled in at the rate of 100 ml/min. After 16 hours of stirring refluxing, and continued bubbling, a ferromagnetic liquid is formed comprising about 50 weight percent kerosene, 25 weight percent dispersant, and 25 weight percent magnetite. To 100 grams of this magnetic fluid is slowly added 100 grams of melted white beeswax U.S.P. To each of five portions of this magnetic fluid at 70° C was added an amount of molten paraffin (m.p. =52° C. ) wax and beeswax as indicated in tabular form below. In each case the homogeneous composition produced was stable to at least 15 melt/freeze cycles in a magnetic field generated by ferrite magnets set in the composition.

| Sample No. | Amt. Ferromagnetic Liquid of 200 gauss (ml) | Molten Paraffin(g) | Molten Beeswax(g) |
|---|---|---|---|
| a | 20 | 80 | 20 |
| b | 20 | 20 | 80 |
| c | 40 | 40 | 10 |
| d | 40 | 10 | 40 |

EXAMPLE 5.

Various plasticized ferromagnetic wax compositions were prepared from a ferromagnetic liquid based on kerosene and formed in accordance with the procedure of Example 1, supra. In each case the magnetic liquid and a premelted mixture of yellow beeswax and medium grade paraffin wax were separately warmed to about 75° C and then mixed with (nonmagnetic) stirring. In each case the ferromagnetic composition was stable to 15 melt/freeze cycles in a magnetic field generated by permanent magnetization containing 51 weight percent kerosene, 37 weight percent colloidal magnetite, and 12 weight percent oleic acid. The final ferrowax compositions are shown in tabular form below.

| Sample No. | Amt. Ferromagnetic Liquid of 370 gauss (ml) | Molten Paraffin (g) | Molten Yellow Beeswax(g) |
|---|---|---|---|
| a | 50 | 200 | 50 |
| b | 4 | 15 | 20 |
| c | 20 | 20 | 5 |
| d | 28 | 20 | 15 |

What is claimed is:

1. Superparamagnetic composition which comprises a mixture of from 10 to 90 weight percent of a hydrocarbon wax and from 90 to 10 weight percent of an oxygenated wax based on the total wax content of the overall composition, said total wax constituting at least 10 containing a colloidal dispersion therein of from 1 to 70 weight percent, based on the weight of the overall composition of a superparamagnetic substance, and from 1 to 20 weight percent based on the weight of the overall composition of at least one surface active agent selected from the group consisting of anionic, cationic, and non-ionic dispersants, said dispersant being at least partially solvatable in the said wax mixture.

2. Composition to claim 1 which has a transition from the solid to the liquid state at a temperature above 40° C. and below 150° C.

3. Composition according to claim 1 which has a transition from the solid state to the liquid state at a temperature above 50° C. and below 65° C., said transition being complete over the span of from 3 to 10° C.

4. Composition according to claim 2 wherein the oxygenated wax is beeswax and the hydrocarbon wax is a paraffin wax.

5. Composition according to claim 4 wherein the dispersant is oleic acid.

6. Composition according to claim 3 wherein the superparamagnetic substance is colloidal magnetite.

7. Composition according to claim 6 wherein the particle size of the colloidal magnetite ranges from 50 to 150 Angstroms.

8. Superparamagnetic composition which comprises a mixture of from 10 to 90 weight percent of an aliphatic hydrocarbon wax having a predominant content of paraffinic hydrocarbons having molecular weights of greater than 190 and from 90 to 10 weight percent of an oxygenated wax having a predominant content of high molecular weight organic acids, alcohols and non-glycerol esters of long chain organic acids, the weight of each of the hydrocarbon wax and the oxygenated wax being based on the total wax content of the overall composition, said total wax constituting at least 10 weight percent of the overall composition, said wax mixture containing a colloidal dispersion therein of from 1 to 70 weight percent, based on the weight of the overall composition of a superparamagnetic substance, and from 1 to 20 weight percent based on the weight of the overall composition of at least one surface active agent selected from the group consisting of anionic, cationic, and non-ionic dispersants, said dispersant being at least partially solvatable in the said wax mixture.

9. Composition according to claim 8 in which the hydrocarbon wax is a paraffin wax and the oxygenated wax is at least one selected from the group consisting of beeswax, carnauba, ouricury, palm, raffra, Japan, esparto, spermaceti and bayberry.

* * * * *